March 31, 1959 P. D. WENZEL 2,879,856
DISC HARROW WITH ANGLING LOCK
Filed Feb. 24, 1954 3 Sheets-Sheet 1

INVENTOR:
PHILIP D. WENZEL
BY: *Emerson B Donnell*
ATTORNEY

INVENTOR:
PHILIP D. WENZEL
BY: Emerson B Donnell
ATTORNEY

March 31, 1959 P. D. WENZEL 2,879,856
DISC HARROW WITH ANGLING LOCK
Filed Feb. 24, 1954 3 Sheets-Sheet 3

INVENTOR:
PHILIP D. WENZEL
BY: *Emerson B. Donnell*
ATTORNEY

United States Patent Office 2,879,856
Patented Mar. 31, 1959

2,879,856
DISC HARROW WITH ANGLING LOCK
Philip D. Wenzel, Stockton, Calif., assignor to J. I. Case Company, Racine, Wis.
Application February 24, 1954, Serial No. 412,327
4 Claims. (Cl. 172—597)

This invention pertains to disc harrows, and, more particularly, it pertains to disc harrow angling locks located between pairs of harrow gangs.

When disc harrows are employed in cultivating land, generally a pair of harrow gangs is used. In the operating position, the pair of gangs is disposed with an angular relation therebetween with a leading gang and a trailing gang. The gangs are generally joined at one side thereof at a common pivot point. With the foregoing arrangement the disc harrow will do its best job of cultivating.

However, that arrangement presents a problem of turning the harrow about the open side of the gangs to cultivate in a return row of the farm land. Various structures have been employed to facilitate this turning and generally they have sought to maintain the gangs in the closed parallel position while making a turn. A particular deficiency of the prior art structures has been the inability of the harrow gangs to automatically return and lock in the same working position that they occupied before the turn was initiated. In most of the known arrangements, it has been necessary to reset the gangs to the working position after each turn.

Further, where disc harrows are used to cultivate orchards, vineyards, and groves, it is frequently necessary to offset the harrow from the path of the tractor and also necessary to have the harrow at a minimum height to avoid damaging the crops. The prior art structures fail to provide a suitable harrow locking mechanism which does not extend above the height of the harrow discs.

It is a principal object of this invention to provide a disc harrow with means for controlling the angular relation between a pair of the harrow gangs. Particularly, this object is to provide a locking mechanism which automatically, and with operating ease, controls the angle between a pair of harrow gangs.

Another object is to provide a disc harrow structure with locking means for maintaining an angular relation between the gangs of the harrow without having the locking means project significantly above the height of the harrow discs.

Still another object of this invention is to provide a disc harrow locking means which assists in maintaining the harrow gangs level while they operate over rough ground.

Still another object is to provide a disc harrow locking means which is easily and readily operated from the tractor without requiring the driver to leave his seat for either the opening or closing of the angle between the harrow gangs. Thus, the driver can close the gangs to turn them around a corner and he can open them to a predetermined or selected set position without getting up from the tractor seat.

Other objects and advantages will become apparent upon reading the following description in conjunction with the drawings, in which, Figure 1 is a front perspective view of a disc harrow with the gangs in the open or working position and incorporating a preferred embodiment of this invention.

Similar reference numerals refer to similar parts throughout the several views.

In the following description the terms "left" and "right" are intended to designate the corresponding direction when facing the direction of travel of the harrow.

Figure 1:
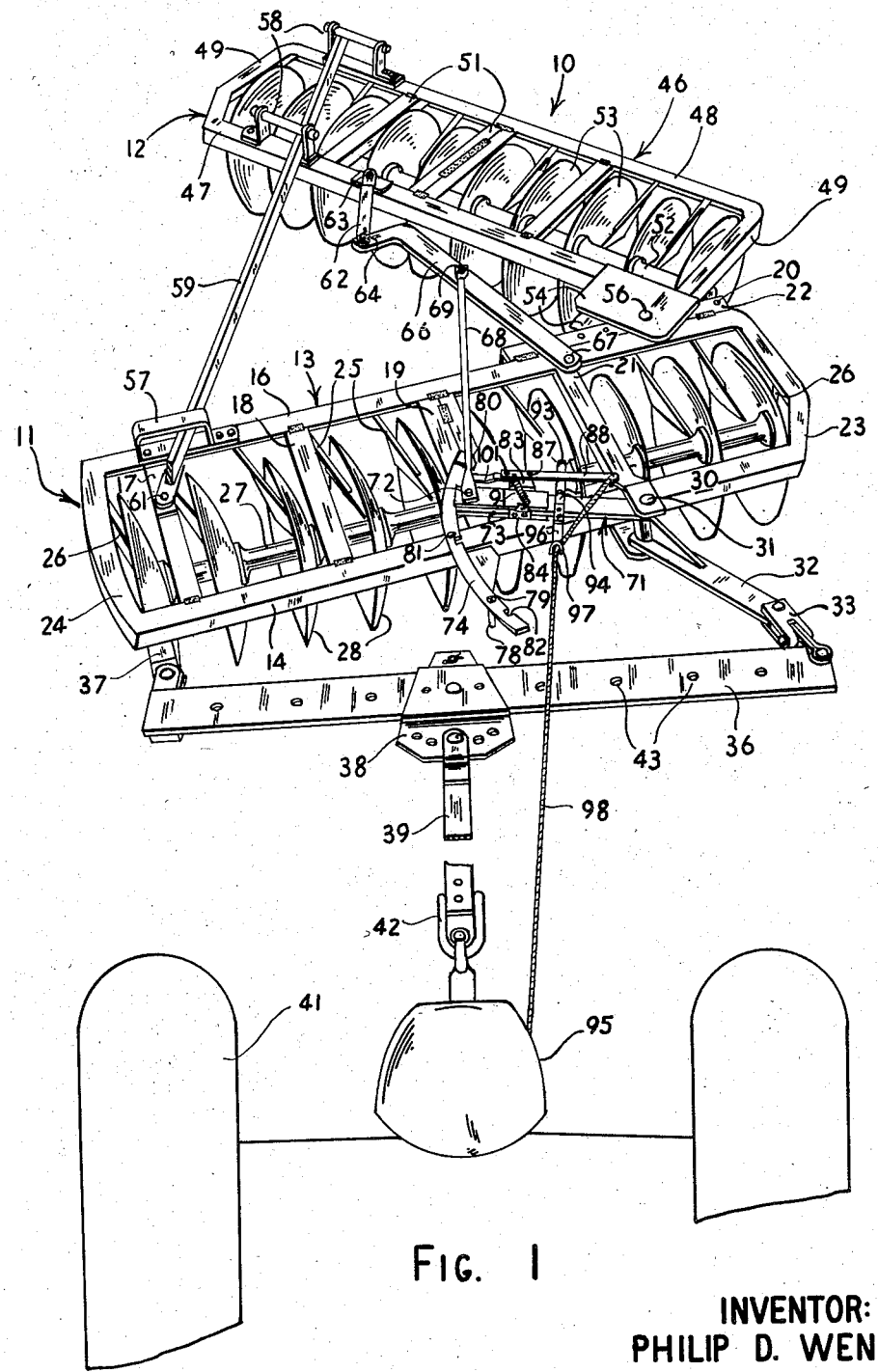

As shown in Figure 1, there is provided a disc harrow, generally designated 10, with a front gang 11 and a rear gang 12, positioned at an angular relation to form a pair of harrow gangs. The front gang 11 preferably consists of a horizontally disposed and rectangularly shaped rigid frame 13. A front bar 14 and a rear bar 16 define the frame 13 while interconnecting cross-bars 17, 18, 19, and 21 are preferably provided to attach bars 14 and 16 and for a further reason hereinafter explained. Also, attached by welding or the like, to the rear left side of the bar 16, to be horizontally disposed, is an extension plate 22 which will be later explained. At this time, it should be noted that plate 22 is provided with a plurality of vertically disposed holes 20.

Attached thereto and depending from opposite left and right sides 23 and 24, respectively, of the frame 13, are bearing members 26 which provide for rotatable reception of a horizontally mounted shaft 27. A plurality of suitably dished discs 28 are spaced transversely along the shaft 27 to be non-rotatable with respect thereto. It is further preferred that each disc be provided with a scraper 25 which is rigidly mounted on the frame 13 to remove dirt from the rotating discs.

It should be noted that the bar 21 is rigidly connected between the bars 14 and 16 by welding or otherwise attaching thereto. The front end of the bar 21 is bifurcated at 30 where it is provided with a vertical pin 31 to pivotally attach to a horizontally extending bar 32 at the front of the frame 13. The opposite end of the bar 32 is preferably provided with a usual shackle and clevis 33 which is pivotally attached thereto. A transversely and horizontally extending bar 36 is pivotally attached at its left end to the shackle and clevis 33 and at its right end to a bracket 37 which is securely fastened onto the right side of the bar 14 of the frame 13. A connector yoke 38 is attached intermediate the ends of the bar 36, with a longitudinally extending draft bar 39 which suitably connects to a tractor 41 through a hitch 42. It should be noted that the bar 36 is preferably provided along its length with a plurality of holes 43 which enable selective attachment of the connector 38 to the bar and thereby regulate the amount of offset of the harrow with respect to the path of the tractor.

Still referring to Figure 1, it will be noted that the rear gang 12 is formed in the same manner as the gang 11. In this instance, the gang 12 preferably consists of a frame 46 with a front and rear frame bar 47 and 48, respectively, and side bars 49, all forming a rigid horizontally disposed frame. Further, the frame 46 is provided with attached interconnecting bars 51 extending between the bars 47 and 48, and the gang has a suitable rotatably mounted shaft 52 with discs 53 spaced therealong. It will be noted that the discs 53 are dished to face to one side of the frame 46 while the discs 28 of the gang 11 are dished in the opposite direction. This arrangement neutralizes the lateral forces acting on the harrow during operation.

As is further apparent from Figure 1, the gangs 11 and 12 are preferably pivotally connected by means of a pair of plates 54 horizontally attached to the left end of the bar 47 of the frame 46 with a vertically disposed pin 56 engaging one of the holes 20 in the angle bar or plate 22 which is on the trailing edge of the leading gang 11. With this arrangement, it will be obvious that the gangs 11 and 12 are pivotally joined together at the pin 56. Also, since a pair of plates 54 is provided, and they are rigidly attached to the bar 47, the pivot connection is desirably a tight fit as each plate preferably abuts an edge of the angle bar 22 to minimize the vertical tolerance at the connection.

The opposite sides of the gangs 11 and 12 are shown to be provided with a leveling device. This device comprises a bracket 57 mounted on the bar 16 of the leading gang 11 while a pair of brackets 58 are mounted one each on the bars 47 and 48 of the trailing gang 12. It will be seen that these brackets form substantially aligned arch ways which receive a horizontally disposed leveling bar 59 which is horizontally pivotally attached at 61 to the bar 17 of the gang 11. Since all three of the brackets receive the bar 59, and do so in a relatively snug manner with respect to the vertical direction, the bar is limited in vertical motion at only one end or the other, thereby maintaining the gangs in a substantially horizontal plane.

The foregoing describes a substantially conventional construction of a pair of disc harrow gangs except as the construction is unique in its combination with the following described angling lock.

Figure 2:
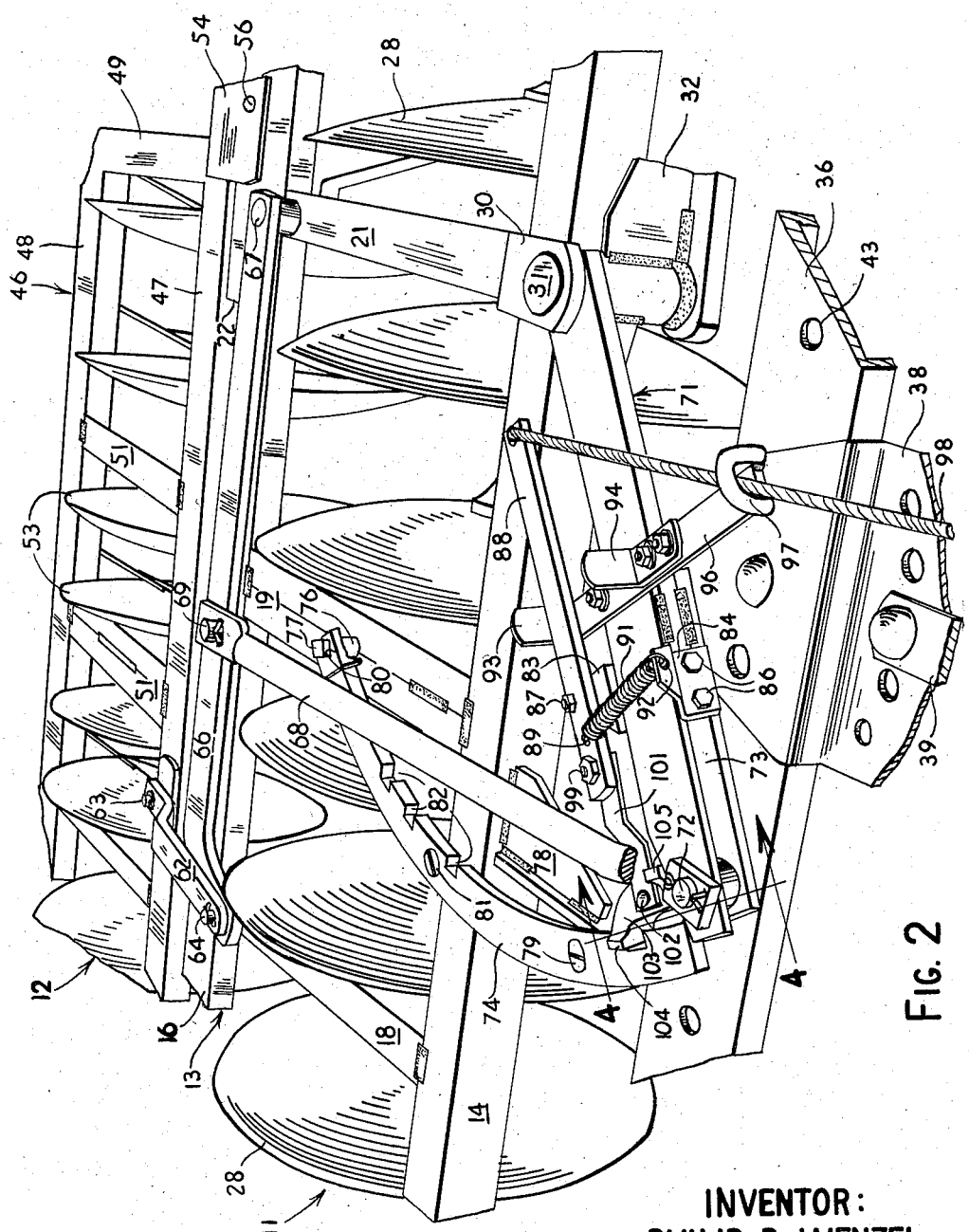
Figure 2 is a fragmentary front perspective view of the disc harrow shown in Figure 1 but with the gangs in the closed or parallel position for turning a corner.

As seen in Figure 1, the angling lock is set to maintain the gangs in a wide open position which can be satisfactorily used in operation of the harrow. The control linkage which governs the pivot angle between the front and rear gang preferably comprises a generally forwardly and horizontally extending connecting member 62 which is pivotally connected to the frame front bar 47 of the rear gang 12 by a vertical pin 63. The forward end of the member 62 contains a vertically attached pin 64 which pivotally connects the member 62 to the rear end of a horizontal curved bar 66 which in turn is pivotally attached at its front end to the rear end of the cross-bar 21 of the gang 11 at a fixed pivot pin 67. A rear gang draft lever or link 68 extends horizontally and forwardly from a point intermediate the ends of the bar 66, where there is a vertical pin 69, to an end of a main control bar 71 where the two are pivotally joined by a pin 72. The main control bar 71 extends horizontally from the vertically disposed pin 31, which is located in the bifurcated end 30 of the bar 21, to substantially the point of pivotal connection of said bar 71 with the draft lever 68. Fig. 2 shows that the bar 32 and the bar 71 are welded into one rigid bar and, therefore, through all positions shown the bars maintain the angular relationship shown in Fig. 1.

From the foregoing description, read in conjunction with Figure 1, it will be apparent that a linkage is provided wherein two stationary pivot points 31 and 67 exist to determine the pivotal path of the members 71 and 66, respectively. The position of these members is determined by the members 62 and 68.

In this preferred embodiment, the actual arrangement for positioning member 68 is hereinafter described. It will be noted that the main control bar 71 is preferably bifurcated at its end 73 to provide for a horizontally disposed slot in that end wherein there is received an arcuately shaped quadrant 74 which is horizontally mounted on the frame 13. The preferred mounting of the quadrant 74 is best shown in Figure 2 where it is seen that a spacer 76 is located on the top of the cross-bar 19 and under the rear end of the quadrant. These parts are then secured to the bar 19 by a bolt 77 which extends therethrough. Also, the front end of the bar 14 of the front gang frame 13 is provided with a bracket 78 which supports the quadrant by an attaching bolt 79 connecting the two in any well known manner. To further secure the quadrant onto the frame 13, a bolt 81 extends therethrough at a central point to connect to the frame bar 14. This connection still maintains the quadrant spaced from the top surface of the frame 13 as shown. It should be obvious that the spaced relation permits the lower section of the bifurcation of the bar 71 to fit underneath the quadrant while the upper side of the bifurcated end fits above the quadrant. It should further be noted that the inner edge of the quadrant 74 is provided with a plurality of notches or indexing slots 82 which are predeterminately spaced therealong. Attached to the end of the quadrant 74 is an abutment plate 80 which limits the rearward movement of the bar 71. The quadrant 74 thus serves as an indexing member, as will be hereinafter apparent, and also the quadrant is located and shaped to be in the path of the arcuate travel of the end of the main control bar 71.

Referring again to the main control bar 71, as shown in Figure 1, there is preferably provided, along the bifurcated section 73, two oppositely disposed plates 83 and 84 which are secured to the bar 71 by two bolts 86 extending therebetween as indicated. The plate 83 is formed with a horizontal upper surface which is slightly higher than the top of the bar 71 and which receives a bolt 87 in a vertical position to provide a pivotal connection for a horizontally extended handle or lever 88 which is mounted thereon at a point approximately two-thirds along the length of the handle. It should be noted that the handle 88 is provided with a hole 89 in its shorter portion to receive and connect a tension coil spring 91 to the handle while the spring is also connected at its opposite end to the plate 84 through a hole 91 in the plate 84. It should then be obvious that the lever 88 is yieldingly maintained in the position shown in Figure 1.

To further control the position of the lever 88, it is preferred that there be a pair of oppositely disposed and spaced apart stops 93 and 94 rigidly attached to the control bar 71 to extend vertically thereabove by being mounted on a stop bar 96. These stops are located at approximately the transverse middle plane of the handle 88 and are shown to be firmly attached to the bar 71 by having the stop bar 96 clamped thereto in a transverse direction. The forward end of the bar 96 is preferably provided with a formed loop or eye 97 through which a rope 98 is threaded to attach to the handle 88 on the end opposite from that end containing the spring 91 with respect to the pivot or fulcrum point 87 of the handle. As shown in Figure 1, the rope 98 extends from the handle 88 to the proximity of the seat 95 on the tractor 41.

It should be obvious that the actuation of the lever 88 is conveniently controlled by the rope 98 and the spring 91 while the stops 93 and 94 limit the pivotal action of the lever.

Attached to the end of the handle 88, near the hole 89, is a vertically disposed bolt or pin 99 which pivotally joins the handle 88 with a lifter link or control dog 101. The latter generally forms a continuation of the handle 88 and extends to a pin 102 which is common with a pawl or latch 103 pivotally mounted at one end between the bifurcation 73 of the control bar 71 and specifically mounted on the pin 72 which extends therethrough, see Figures 2 and 4. The pawl 103 terminates in a tooth 104 which selectively engages the notches 82 of the quadrant 74 as hereinafter explained.

As seen in Figure 1, the gangs 11 and 12 are in the open position. This requires that the control bar 71 be pivoted to place the end thereof rearwardly on the quadrant 74 to permit the draft lever 68 to extend to its most rearward position. Since the pawl tooth 104 is then engaged in one of the notches 82, the linkage described above locks the pawl therein, and the draft lever is firmly attached between the two gangs in a locked position.

When it is desired to make a right hand turn with the harrow 10, it is known to be a practically impossible turn without closing the gangs to a parallel position.

To accomplish this with the structure of this invention, the operator merely pulls on the rope 98 from his position on the tractor seat. That pivots the handle 88 about its fulcrum 87 while the stop 94 limits the movement of the handle. In this action, the lifter link 101 is retracted with respect to the pawl 103 which is then disengaged from one of the notches 82. The operator is then able to back the tractor until the gang 11 becomes parallel with a new transverse position of the gang 12. All this time the rope is maintained taut to keep the pawl disengaged from the quadrant. The harrow then is positioned as shown in Figure 2 with the gangs parallel and with the rope tension released to allow the spring 91 to re-position the handle 88 to return the pawl to re-engage one of the notches 82. This locks the gangs, as shown in Figure 2, and the harrow is then ready for a right turn.

Figure 3:
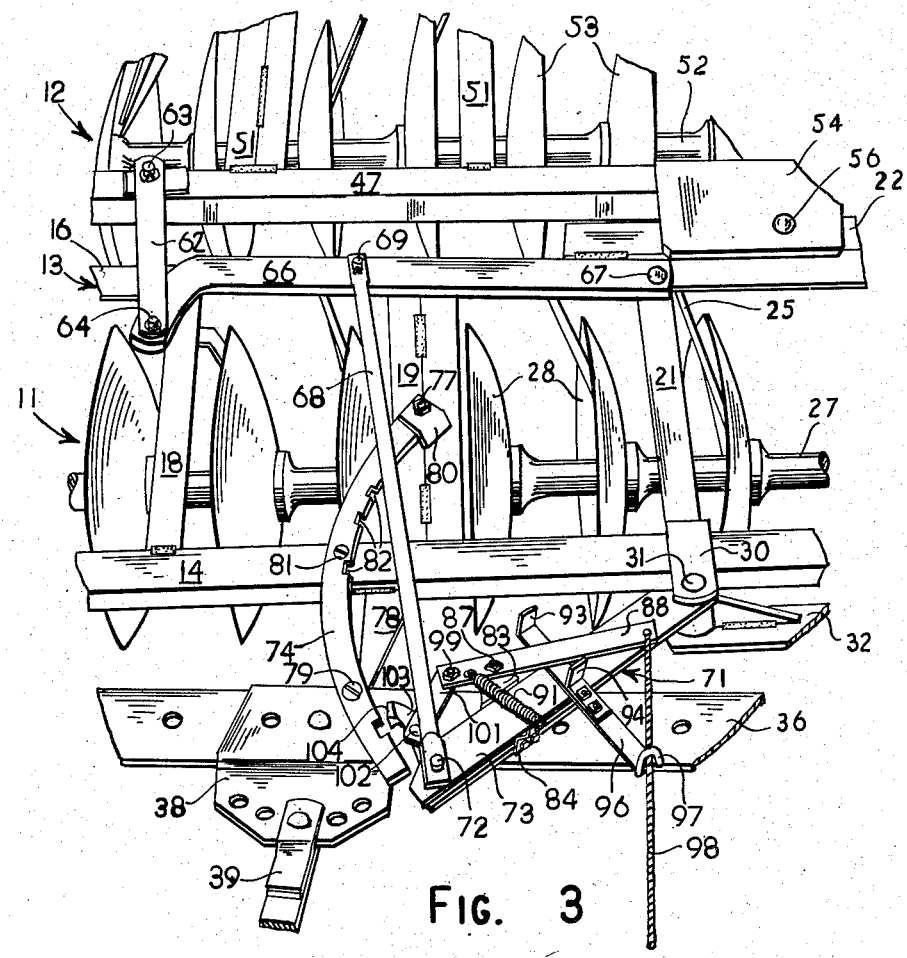
Figure 3 is a fragmentary front perspective view of the disc harrow shown in Figure 2 and shown in the position of that of Figure 2 but having the angling lock unlatched.

Figure 3 shows the position of the lock when the rope is again pulled to disengage the pawl as shown. In this position, forward movement of the tractor separates the gangs 11 and 12 while release of the rope 98 will lock the gangs in any selected angled position corresponding to the engagement of the pawl within a selected notch.

From the foregoing, it should be obvious that the linkage is so arranged that a minimum of effort is required to operate the lock. In this regard, it should be noted that the pawl is retracted from a notch 82 by the pawl tooth moving straight out of the notch. Also, it should be understood that it is preferred to have the entire lock device to be no higher than the discs. This permits the use of the harrow under low hanging foliage.

Figure 4:
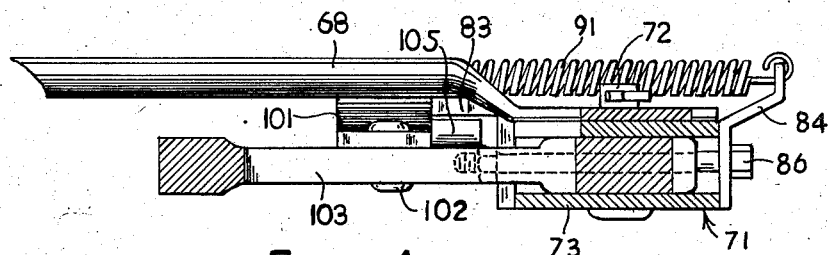
Figure 4 is a sectional view taken on the line 4—4 of Figure 2, perpendicular to the longitudinal axis of the control bar.

To further assure a locked position of the pawl 103 in one of the notches 82, as shown in Figs. 2 and 4, the pawl is preferably provided with an upwardly extending lug 105 which is integral therewith. The lug then abuts the side of the link 101 to limit the movement of the link 101 and, correspondingly, the pawl 103. Thus, either or both the stop 93 or the lug 105 will maintain the linkage in limited movement beyond the dead center position shown so that the reactions from the harrow gangs cannot unlatch the pawl.

While a specific embodiment of this invention has been shown and described, the scope of this patent should be limited only by the appended claims.

I claim:

1. A disc harrow comprising a front gang and a rear gang and pivotal means connecting said gangs at one end thereof, latching means comprising a control bar pivoted on said front gang and swingable fore-and-aft over said front gang, an arcuate quadrant secured to said front gang to be disposed adjacent the free end of said control bar and having a plurality of notches, a lever pivotally attached intermediate its ends to said control bar, a latch pawl pivoted on said control bar for selective engagement with said notches, a link pivotally connected at one end to said pawl and pivotally connected at the other end to one end of said lever, said lever and said link being arranged whereby the pivots thereof are substantially in a straight line when said latch pawl is engaged with one of said notches, resilient means to bias said pawl into engagement with one of said notches, means attached to the other end of said lever to permit pivoting of the latter to manually release said pawl from said quadrant, a connecting bar pivotally attached at one end thereof to said front gang adjacent said pivotal means and connected at the other end thereof with said rear gang at the end of the latter opposite the location of said pivotal means, and a draft member attached at one end to said free end of said control bar and at the other end thereof to a point intermediate said connecting bar.

2. A disc harrow comprising in combination with a draft vehicle a front gang and a rear gang, pivot means connecting said gangs together at one end, a transverse draft member disposed forward of said front gang and connected to the opposite ends of said front gang, a draft bar attached to said draft member for connecting to said draft vehicle, a gang angling control bar pivotally mounted on said front gang, an indexing member supported adjacent said control bar, a toggle attached to said control bar for selectively locking the latter with said indexing member in both directions of pivotal movement of said control bar, resilient means for yieldingly urging said toggle into an over-center locked position, an actuating connection extending from said toggle to said draft vehicle for actuating said toggle against the influence of said resilient means to unlock said toggle, a draft link attached at one end to said control bar and connected with said rear gang at the other end of said gangs, a leveling bar horizontally pivotally attached to said other end of one of said gangs and lying across the top of said other end of the other of said gangs, and means for slidably securing said leveling bar to said gangs and restricting vertical movement of said bar with respect to said gangs.

3. An angling lock for two gangs of disc harrows, comprising in combination two gangs of disc harrows disposed in a front and rear relation and pivotally joined at one end of said gangs, an arcuately shaped indexing quadrant fixedly mounted on the front gang of said gangs and having depressions spaced therealong, a control bar pivotally mounted on said one end of said front gang and extending adjacent said quadrant, a pawl pivotally mounted on the extended end of said control bar and arranged to engage said depressions upon pivotal action of said pawl and lock with said quadrant, self-energizing toggle means attached to said pawl for positively securing the latter in locked position with said quadrant and against pivotal motion of said control bar in both directions of pivot, a draft link connected to said extended end of said control bar and to the rear gang of said gangs on the side of the latter opposite said one end thereof, and a plurality of draft bars attached directly to said front gang for providing the draft connection with a draft vehicle.

4. In a latching means for a disc harrow of the type comprising front and rear gangs hinged together adjacent one side of the harrow for swinging of said gangs relatively to each other in a substantially horizontal plane between a closed transport and an open working position, the combination of a quadrant mounted on said front gang and providing a plurality of notches, a control bar pivoted on the front gang and having a free end disposed to swing adjacent said quadrant, connections from said control bar to said rear gang arranged to position the latter in response to positioning of said control bar, a latch pawl shiftably supported on said control bar in position to be moved into and out of engagement with said notches, a toggle lever fulcrumed on said control bar, a toggle link pivotally connected at one end to said pawl and at the other end to said toggle lever, said lever and said link being so arranged that the several pivots are disposed substantially in a straight line when the latch pawl is engaged in one of said notches, means to bias said toggle lever into such position, means connected to said lever arranged to overcome said biasing means at will, and means for propelling the harrow, and connected to said control bar at a point tending to swing it in a harrow opening direction upon propulsion of the harrow in one direction.

References Cited in the file of this patent

UNITED STATES PATENTS

| | | |
|---|---|---|
| 1,764,402 | Hamilton | June 17, 1930 |
| 1,775,269 | Barker | Sept. 9, 1930 |
| 1,834,519 | Dewend | Dec. 1, 1931 |
| 2,152,928 | Sjorgren et al. | Apr. 4, 1939 |
| 2,164,211 | Johnson | June 27, 1939 |
| 2,169,471 | Mitchell et al. | Aug. 15, 1939 |
| 2,196,485 | White | Apr. 9, 1940 |
| 2,237,009 | Mitchell | Apr. 1, 1941 |
| 2,369,725 | Dyrr | Feb. 20, 1945 |